(12) United States Patent  (10) Patent No.: US 10,244,221 B2
Lee et al.  (45) Date of Patent: Mar. 26, 2019

(54) DISPLAY APPARATUS AND METHOD

(71) Applicant: SAMSUNG ELECTRONICS CO., LTD., Suwon-si, Gyeonggi-do (KR)

(72) Inventors: Seok Lee, Hwaseong-si (KR); Ju Yong Park, Seongnam-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 14/489,977

(22) Filed: Sep. 18, 2014

(65) Prior Publication Data

US 2015/0092030 A1  Apr. 2, 2015

(30) Foreign Application Priority Data

Sep. 27, 2013 (KR) .......................... 10-2013-0115575
Nov. 1, 2013 (KR) .......................... 10-2013-0132420

(51) Int. Cl.
*G01S 7/20* (2006.01)
*H04N 13/122* (2018.01)
*H04N 13/128* (2018.01)
*H04N 13/305* (2018.01)
*G02B 27/22* (2018.01)
*H04N 13/351* (2018.01)

(52) U.S. Cl.
CPC ....... *H04N 13/122* (2018.05); *G02B 27/2214* (2013.01); *H04N 13/128* (2018.05); *H04N 13/305* (2018.05); *H04N 13/351* (2018.05)

(58) Field of Classification Search
USPC .......................................................... 348/51
See application file for complete search history.

(56) References Cited

U.S. PATENT DOCUMENTS 6,157,491 A * 12/2000 Watanabe ............ G03B 21/625
                                                     359/619
7,874,678 B2 * 1/2011 Hines ................. G02B 27/2214
                                                     353/7

(Continued)

FOREIGN PATENT DOCUMENTS

CN  102449534 A  5/2012
CN  103067728 A  4/2013

(Continued)

OTHER PUBLICATIONS

Extended European Search Report dated Feb. 13, 2015 in counterpart European Application No. 14183959.7 (8 pages, in English).

(Continued)

*Primary Examiner* — Chikaodili E Anyikire
(74) *Attorney, Agent, or Firm* — NSIP Law

(57) ABSTRACT

A display apparatus providing a multi-view image is provided, which may include a panel unit to provide light through a plurality of pixels corresponding respectively to a plurality of viewpoints, and an optical unit to provide the light to a left eye position and a right eye position at a pre-designated viewing distance, respectively, wherein the optical unit may be configured for light from pixels for view images having discontinuous viewing indices, among the plurality of pixels, to be transferred to the left eye position and the right eye position.

23 Claims, 12 Drawing Sheets

(56) References Cited

U.S. PATENT DOCUMENTS

| | | | |
|---|---|---|---|
| 2006/0152812 A1* | 7/2006 | Woodgate | G02B 3/005 |
| | | | 359/619 |
| 2007/0177006 A1 | 8/2007 | De Zwart et al. | |
| 2010/0315492 A1* | 12/2010 | Baik | H04N 5/23219 |
| | | | 348/51 |
| 2011/0096071 A1 | 4/2011 | Okamoto et al. | |
| 2011/0181706 A1* | 7/2011 | Harrold | G02B 27/225 |
| | | | 348/51 |
| 2011/0242289 A1* | 10/2011 | Fukushima | G06T 15/20 |
| | | | 348/51 |
| 2012/0044330 A1* | 2/2012 | Watanabe | G02B 27/2214 |
| | | | 348/54 |
| 2012/0105954 A1* | 5/2012 | Prouty, IV | G02B 27/2214 |
| | | | 359/462 |
| 2012/0154394 A1 | 6/2012 | Horikoshi et al. | |
| 2012/0162212 A1 | 6/2012 | Takahashi et al. | |
| 2012/0206445 A1* | 8/2012 | Chiba | H04N 13/0486 |
| | | | 13/486 |
| 2012/0293640 A1 | 11/2012 | Hirai et al. | |
| 2013/0100120 A1 | 4/2013 | Sumi | |
| 2013/0257928 A1* | 10/2013 | Lee | G02B 27/22 |
| | | | 345/697 |
| 2014/0078268 A1* | 3/2014 | Watanabe | G02B 27/2214 |
| | | | 348/54 |

FOREIGN PATENT DOCUMENTS

| | | |
|---|---|---|
| DE | 102009056591 A1 | 6/2011 |
| EP | 1489859 A2 | 12/2004 |
| JP | 07-104212 | 4/1995 |
| JP | 2004-144792 | 5/2004 |
| JP | 2013-013056 A | 1/2013 |
| JP | 2013-190501 | 9/2013 |
| JP | 2014-182160 | 9/2014 |
| JP | 2015-037282 | 2/2015 |
| KR | 10-2012-0068127 | 6/2012 |
| KR | 10-2012-0070363 | 6/2012 |
| KR | 10-2012-0075372 | 7/2012 |
| WO | WO 2013/029696 A1 | 3/2013 |
| WO | WO 2013/115444 A1 | 8/2013 |

OTHER PUBLICATIONS

Chinese Office Action dated Jun. 21, 2017 in corresponding Chinese Patent Application No. 201410508501.0 (18 Pages in English and 12 pages in Chinese).

Japanese Office Action dated Mar. 6, 2018 in counterpart Japanese Patent Application No. 2014-198528 (2 pages in English and 3 pages in Japanese).

* cited by examiner

800

1000

DISPLAY APPARATUS AND METHOD

CROSS-REFERENCE TO RELATED APPLICATIONS

This application claims the priority benefit of Korean Patent Application No. 10-2013-0115575, filed on Sep. 27, 2013, and Korean Patent Application No. 10-2013-0132420, filed on Nov. 1, 2013, in the Korean Intellectual Property Office, the disclosures of which are incorporated herein by reference.

BACKGROUND

1. Field

One or more embodiments relate to a display apparatus and method, and more particularly to, a display apparatus and method adjusting a viewpoint in a multi-view display apparatus, such as a television (TV) and a personal electronic device, as only examples.

2. Description of the Related Art

To effectively realize a 3-dimensional (3D) image providing a 3D feel or effect, images of different views may to be presented to an observer. For example, a stereoscopic display may present respectively different images to a left eye and a right eye of a person. The stereoscopic display may depend on a filtering process, where filtering glasses are worn, so one image is filtered to a left eye and another image is filtered to the right eye. To realize the 3D image without using such a filter process, the 3D feel or effect may be achieved by presenting different spatially divided views of a scene to the observer, as an example of an autostereoscopic display. Such an autostereoscopic display may use an optical unit to realize an image by spatially dividing the image. Representatively, a lenticular lens or a parallax barrier may be used as the optical unit. The lenticular lens may express each pixel image only in a particular direction whereas the parallax barrier may show only particular pixels from a particular direction through a slit.

Accordingly, glass-free multi-view three-dimensional (3D) display technologies may be based on a lenticular lens scheme or a parallax barrier scheme, for example. However, when a user views a screen of a multi-view 3D display apparatus, a pseudoscopic illusion may occur when the user moves between viewing cones, e.g., respective designed regions in front of the screen where autostereoscopic viewing may be achieved. For example, when the user is moving between viewing cones a left eye of the user may receive light of an eighth view image in a predetermined viewing cone that was intended for the right eye and a right eye of the user may receive light of a first view image of another viewing cone adjacent to the predetermined viewing cone intended for the left eye, among viewing cones provided by an 8-view display apparatus, the image ultimately viewed by the user may be referred to as a pseudoscopic image. Such a pseudoscopic image may also be referred to as an inverted stereo image. In addition, when the disparity difference between view images is great, such as in the above pseudoscopic region formed by the example eighth view of one viewing cone and first view of an adjacent viewing cone, the user may not recognize a 3D image or pseudoscopic image, but rather, may recognize two different images due to a critical amount of crosstalk (X-talk) between the two view images.

SUMMARY

One or more embodiments provide a display apparatus providing a multi-view image, the display apparatus including a panel unit including a pixel array including a plurality of pixels for respectively providing light corresponding to a plurality of viewpoints of the multi-view image to an optical unit, and the optical unit to direct light from pixels, of the plurality of pixels, providing light for view images, of the multi-view image, having discontinuous viewing indices to a left eye position and a right eye position of a user, respectively, to provide a three dimensional (3D) effect.

The optical unit may include a lenticular lens array to perform the directing of the light from the pixels.

The display apparatus may further include a processor to adjust respective depth disparities of the view images of the multi-view image so as to compensate for an exaggeration of depth caused by using the view images having the discontinuous viewing indices to generate the 3D effect.

The optical unit may be configured to have properties different from a design specification where light, from pixels of a general pixel array, for view images having continuous viewing indices is provided by a general optical unit to a left eye position and a right eye position, respectively, to provide the 3D effect.

The design specification may include information of at least one of a refractive index corresponding to a material of the general optical unit, a radius of curvature of a surface of the general optical unit, a pitch of the general lens array included in the general optical unit, a distance from a general panel unit, including the general lens array, to the surface of the general optical unit, and a general lens array interval of the general optical unit, so as to provide the 3D effect using the view images having the continuous viewing indices.

The optical unit may be configured to have a refractive index less than the refractive index of the general optical unit that provides the 3D effect by directing the light from the pixels, of the general pixel array, for the view images having the continuous viewing indices to the left eye position and the right eye position, respectively, and so that the refractive index of the optical unit provides the 3D effect when the light from the pixels providing the light for the view images having the discontinuous viewing indices is provided to the left eye position and the right eye position, respectively.

The optical unit may be configured to have a radius of curvature greater than a radius of curvature of the general optical unit that provides the 3D effect by directing the light from the pixels, of the general pixel array, for the view images having the continuous viewing indices to the left eye position and the right eye position, respectively, and so that the radius of curvature of the optical unit provides the 3D effect when the light from the pixels providing the light for the view images having the discontinuous viewing indices is provided to the left eye position and the right eye position, respectively.

The optical unit may be configured to have a pitch less than the pitch of the general optical unit that provides the 3D effect by directing the light from the pixels, of the general pixel array, for the view images having the continuous viewing indices to the left eye position and the right eye position, respectively, and so that the pitch of the optical unit provides the 3D effect when the light from the pixels providing the light for the view images having the discontinuous viewing indices is provided to the left eye position and the right eye position, respectively.

The optical unit may be configured so a lens array interval of the optical unit matches the lens array interval of the general optical unit that provides the 3D effect by directing the light from the pixels, of the general pixel array, for the view images having the continuous viewing indices to the left eye position and the right eye position, respectively, with a bottom portion between the individual protrusions of the optical unit being configured to block light.

The optical unit may be configured to have at least one of a radius of curvature greater than the radius of curvature of the general optical and a refractive index less than the refractive index of the general optical so that the general optical unit that provides the 3D effect by directing the light from the pixels, of the general pixel array, for the view images having the continuous viewing indices to the left eye position and the right eye position, respectively, and so that the radius of curvature of the optical unit and/or the refractive index of the optical unit provides the 3D effect when the light from the pixels providing the light for the view images having the discontinuous viewing indices is provided to the left eye position and the right eye position, respectively.

The optical unit may be configured to have a distance from the panel unit to a surface of the optical unit that is greater than the distance from the general panel unit to the surface of the general optical unit that provides the 3D effect by directing the light from the pixels, of the general pixel array, for the view images having the continuous viewing indices to the left eye position and the right eye position, respectively, and so that the distance of the optical unit provides the 3D effect when the light from the pixels providing the light for the view images having the discontinuous viewing indices is directed to the left eye position and the right eye position, respectively.

The optical unit may be configured to have a lens array interval that is less than a lens array interval of the general optical unit that provides the 3D effect by directing the light from the pixels, of the general pixel array, for the view images having the continuous viewing indices to a left eye position and a right eye position, respectively, and so that the lens array interval of the optical unit provides the 3D effect when the light from the pixels providing the light for the view images having the discontinuous viewing indices is directed to the left eye position and the right eye position, respectively.

The 3D effect may be represented by the user observing a corresponding autostereoscopic image.

One or more embodiments provide a display apparatus providing a multi-view image, the display apparatus including a panel unit including a pixel array, and an optical unit to form a viewing cone and direct light from pixels, included in the pixel array, in a plurality of directions of the viewing cone, wherein the viewing cone provides light from the pixels for view images, of the multi-view image, having discontinuous viewing indices that is respectively directed by the optical unit to a left eye position and a right eye position of a user, to provide a three dimensional (3D) effect to the user.

The display apparatus may further include a processor to adjust depth disparities of the multi-view image so as to compensate for an exaggeration of depth caused by using the view images having the discontinuous viewing indices to generate the 3D effect.

The optical unit may be configured to have a refractive index that is less than refractive indices of optical units that provide the 3D effect by directing light from pixels for view images of a corresponding multi-view image having continuous viewing indices to the left eye position and the right eye position, respectively, and so that the refractive index of the optical unit provides the 3D effect when the light from the pixels for the view images having the discontinuous viewing indices is directed to the left eye position and the right eye position, respectively.

The optical unit may be configured to have a radius of curvature greater than radii of curvature of optical units that provide the 3D effect by directing light from pixels for view images of a corresponding multi-view image having continuous viewing indices to the left eye position and the right eye position, respectively, and so that the radius of curvature of the optical unit provides the 3D effect when the light from the pixels for the view images having the discontinuous viewing indices is directed to the left eye position and the right eye position, respectively.

The optical unit may be configured to have a pitch less than pitches of optical units that provide the 3D effect by directing light from pixels for view images of a corresponding multi-view image having continuous viewing indices to the left eye position and the right eye position, respectively, and so that the pitch of the optical unit provides the 3D effect when the light from the pixels providing light for view images having the discontinuous viewing indices is directed to the left eye position and the right eye position, respectively.

The optical unit may be configured so that a lens array interval of the optical unit matches any of lens array intervals of optical units that provide the 3D effect by directing light from pixels for the view images of the corresponding multi-view image having the continuous viewing indices to the left eye position and the right eye position, respectively, with a bottom portion between individual protrusions of the optical unit being coated with a material that blocks light.

The optical unit may be configured to have at least one of a radius of curvature and refractive index that are respectively greater and lesser than radii and refractive indices of optical units that provide the 3D effect by directing the light from the pixels for the view images of the corresponding multi-view image having the continuous viewing indices to the left eye position and the right eye position, respectively, and so that the radius of curvature and/or the refractive index of the optical unit provides the 3D effect when the light from the pixels providing light for the view images having the discontinuous viewing indices is directed to the left eye position and the right eye position, respectively.

The optical unit may be configured to have a distance from the panel unit to a surface of the optical unit that is greater than corresponding distances of optical units that provide the 3D effect by directing the light from pixels for view images of a corresponding multi-view image having continuous viewing indices to the left eye position and the right eye position, respectively, and so that the distance from the panel unit to the surface of the optical unit provides the 3D effect when the light from the pixels providing light for the view images having the discontinuous viewing indices is directed to the left eye position and the right eye position, respectively.

The optical unit may be configured to have a lens array interval that is less than lens array intervals of optical units that provide the 3D effect by directing light from pixels for view images of a corresponding multi-view image having continuous viewing indices to the left eye position and the right eye position, respectively, and so that the lens array interval of the optical unit provides the 3D effect when the light from the pixels providing light for the view images having the discontinuous viewing indices is directed to the left eye position and the right eye position, respectively.

The 3D effect may be represented by the user observing a corresponding autostereoscopic image.

One or more embodiments provide a method of providing a multi-view image, the method including providing respective light from a plurality of pixels corresponding to a plurality of viewpoints of the multi-view image, and directing light from pixels, of the plurality of pixels, providing light for view images, of the multi-view image, having discontinuous viewing indices to a left eye position and a right eye position of a user, respectively, to provide a three dimensional (3D) effect to the user.

The method may further include decreasing depth disparities of the view images of the multi-view image so as to compensate for an exaggeration of depth caused by using the view images having the discontinuous viewing indices to provide the 3D effect.

The 3D effect may be represented by the user observing a corresponding autostereoscopic image.

One or more embodiments provide a method of providing a multi-view image, the method including providing respective light from pixels corresponding to a plurality of viewpoints of the multi-view image, and forming a viewing cone and directing the respective light from the pixels in a plurality of directions of the viewing cone, wherein the viewing cone provides light from the pixels for view images, of the multi-view image, having discontinuous viewing indices that is directed to a left eye position and a right eye position of a user, to provide a three dimensional (3D) effect to the user.

The method may further include decreasing depth disparities of the multi-view image so as to compensate for an exaggeration of depth caused by using the view images having the discontinuous viewing indices to generate the 3D effect.

The 3D effect may be represented by the user observing a corresponding autostereoscopic image.

One or more embodiments provide a display apparatus for providing a multi-view image, the apparatus including a panel unit to drive a plurality of pixels of the panel unit to provide light for different view images, representing different viewpoints, of the multi-view image so that view images according to their continuous viewing indices are sequentially projected through repeated respective sequential arrangements of the plurality of pixels, and an optical unit to direct light from pixels providing light for view images, of the multi-view image, having discontinuous viewing indices to a left eye position and a right eye position of a user, respectively, to generate an autostereoscopic image.

One or more embodiments provide a non-transitory computer-readable medium including computer readable instructions to control at least one processing device to implement a method for providing a multi-view image, the method including decreasing depth disparities of the multi-view image by a factor of 1/N, N being a natural number and greater than 1, and driving a plurality of pixels of a panel unit to respectively provide light corresponding to a plurality of view images of the multi-view image, respectively representing plural viewpoints of the multi-view image, through a pixel array included in the panel unit, and so that the respectively provided light, from pixels of the plurality of pixels that are separated by an index distance of N, provides view images, of the plural view images, having discontinuous viewing indices to a left eye position and a right eye position of a user, respectively, to provide a three dimensional (3D) effect to the user.

The 3D effect may be represented by the user observing a corresponding autostereoscopic image.

Additional aspects of one or more embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
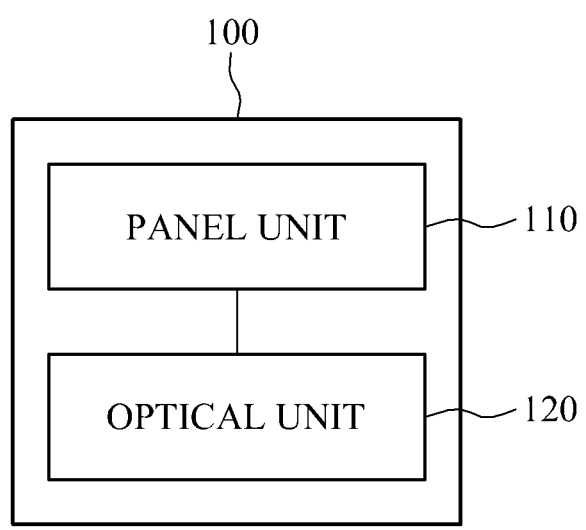
FIG. 1 illustrates a display apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention. In addition, terms used herein are selected from terms generally understood by those skilled in the related art, but may have different meanings according to technical developments and/or changes, practices, and preferences of an engineer. Accordingly, the terms used herein should not be construed as limiting the technical spirit, and should be construed as illustrative terms used merely to describe at least one or more embodiments.

FIG. 1 illustrates a display apparatus 100, according to one or more embodiments.

Referring to FIG. 1, the display apparatus 100 may include a panel unit 110 and an optical unit 120, for example.

The panel unit 110 may include a pixel array that provides a multi-view image. In the pixel array, sets of differing pixels respectively corresponding to a plurality of viewpoints, for example, eight viewpoints, may be repeatedly disposed in a predetermined direction or arrangement to provide the different view images of the multi-view image. For example, in a case of an 8-view image display apparatus, respective pixels that correspond to viewing images of a first viewpoint, a second viewpoint, a third viewpoint, a fourth viewpoint, a fifth viewpoint, a sixth viewpoint, a seventh viewpoint, and an eighth viewpoint may be arranged in a sequence in the pixel array, and such a sequential view arrangement may be repeatedly presented across the pixel array. For reference, although an "8-view image" display apparatus is described as an example of the display apparatus to project the multi-view image, such an example is provided only for an understanding of one or more embodiments and thus, embodiments should not be construed as being limited to a predetermined number of view images.

The panel unit 110 may correspond to a liquid crystal display (LCD) panel or an organic light emitting diode (OLED) panel, as only examples. However, the structure of the panel unit 110 is not limited to such predetermined structures.

The example eight view images provided by the panel unit 110 may be presented so as to have a respective angular distribution by the optical unit 120.

For example, the optical unit 120 may include a lenticular lens array, and be disposed on an external surface of the panel unit 110 in the display apparatus 100, as only an example.

In general, multi-view display apparatuses may be designed according to a rationally expected viewing distance of a user. The viewing distance may correspond to a pre-designated viewing distance where an autostereoscopic image may be seen, and be determined based on various factors, for example, a panel size of a display apparatus, a resolution, a country of a consumer market, a residential culture, and a difficulty in technical implementation, as only examples. For example, in one or more embodiments, the viewing distance may be predetermined to be a range and/or a value between 3.5 meters (m) and 7 m.

The optical unit 120 may have a structure in which light from pixels projecting respective view images according to a discontinuous viewing index is to be respectively directed toward a left eye position and a right eye position of a user positioned at a pre-designated viewing distance. As only an example, with this structure, an autostereoscopic image may be designed to be seen by the user, e.g., designed to provide the user with a 3D effect, when an example third (3rd) view image is set to be provided to the left eye of the user and an example seventh (7th) view image may be set to be provided to the right eye of the user, positioned at the pre-designated viewing distance. These differently numbered view images (or view images with different viewing indices), e.g., first, second, third, etc., may refer to or reflect spatial differences between the locations of real or virtual cameras that potentially captured the respective view images of a scene. For example, the first and second view images may be more alike as their respective viewpoints may be more closely positioned relative to the scene, compared to the first and eighth view images where the respective viewpoints may be less closely positioned relative to the captured scene and thus less alike, as only examples. Below, such first, second, third, etc., view images are respectively identified in FIG. 2 for each pixel by corresponding viewing indices 1, 2, 3, etc.

Similarly, as described above and to be described in greater detail below, a "viewing index" difference or disparity between these viewpoints provided to the left eye and provided to the right eye may correspond to "4" (=7−3). Here, this viewing index difference of "4" is provided as only an example of comparisons between the different viewpoints to discern differences between view images being provided to the respective eyes. The viewing index difference may correspond to an integer, for example, greater than or equal to 2. The case where the viewing index difference is greater than "1", e.g., 2, for providing autostereoscopic images will be defined herein as a discontinuous viewing index or a non-continuous viewing index, such as when view images having discontinuous viewing indices are provided to left and right eyes, respectively, according to one or more embodiments.

Conventionally, a continuous viewing index would be provided, e.g., when a third view image is to be provided to the left eye of the user a fourth view image would be provided to the right eye of the user. Here, the user may recognize the third view image provided to the left eye and the fourth view image provided to the right eye as an autostereoscopic image, providing a three-dimensional (3D) effect to the user.

However, as described above, when the user is positioned at a boundary between viewing cones, an example eighth view image from one viewing cone may be received at the left eye and an example first view image from another, e.g., adjacent, viewing cone may be received at the right eye and thus, rather than the autostereoscopic image the user may observe a pseudoscopic image. Furthermore, due to the considerably great disparity difference of "7" between the example eighth view image and the example first view image, the user may experience a critical amount of crosstalk (X-talk). In this case, the user may not recognize the provided images as a 3D image, but rather, may separately recognize the two separate two-dimensional (2D) images, which may be undesirable.

Accordingly, in one or more embodiments, there is provided a structure of a display apparatus that may prevent view images received at the left eye and the right eye, respectively, of the user positioned at the pre-designated viewing distance, for example, from having continuous viewing indices, such as by a structure of the optical unit 120, for example. Said another way, one or more embodiments may provide an optical unit that is designed to provide an autostereoscopic image to a user within a pre-designated example viewing distance using view images having discontinuous or non-continuous viewing indices, e.g., so to minimize or reduce a corresponding viewing index difference. Rather, as noted above, when the viewing index difference is not minimal or reduced, such as the above example maximum viewing index difference of 7 in an 8-view image approach, the user may actually separately recognize two different 2D images. Thus, in one or more embodiments, with a minimized or reduced viewing index difference, the received two 2D images may not be separately recognized and may merely be observed as a pseudoscopic image.

In previous approaches, the structure of an optical unit in which view images having continuous viewing indices are respectively provided to a left eye position and a right eye position of a user positioned at a pre-designated viewing distance will be referred to as a general design specification. This continuous viewing index approach would correspond to the viewing index difference being 1, though as noted above this viewing index difference jumps to "7" when the user moves between viewing cones when the general design specification is used.

For example, the general design specification may include at least one of a refractive index corresponding to a material of the optical unit, a radius of curvature of a surface of the optical unit, a pitch of a lens array included in the optical unit, a distance from a panel unit to the surface of the optical unit, and a lens array interval of the optical unit, designed so as to provide autostereoscopic images using continuous viewing indices.

In one or more embodiments, a structure of the optical unit 120 may be manufactured according to a specification that is different from the general design specification, e.g., with such a specification including at least one of a refractive index corresponding to a material of the optical unit, a radius of curvature of a surface of the optical unit, a pitch of a lens array included in the optical unit, a distance from a panel unit to the surface of the optical unit, and a lens array interval of the optical unit, designed so as to provide autostereoscopic images using a discontinuous viewing index approach according to one or more embodiments.

When the optical unit 120 is manufactured to have a design specification according to one or more embodiments, autostereoscopic images may be seen based on light from pixels for view images having discontinuous viewing indices being provided to a left eye position and a right eye position, respectively.

With respect to a refractive index corresponding to a material of the optical unit 120, the optical unit 120 according to one or more embodiments may have a refractive index different from that specified in the general design specification. In such an embodiment, the optical unit 120 may be manufactured to have a second refractive index less than a first refractive index of the general design specification that is designed to provide the respective light from the pixels for view images having continuous viewing indices to the left eye position and the right eye position. The second refractive index may correspond to a refractive index of the optical unit 120 at which light from pixels for view images having discontinuous viewing indices is provided to the left eye position and the right eye position, respectively, to provide an autostereoscopic image.

With respect to a lens array pitch of the optical unit 120, the optical unit 120 may have a pitch different from that specified in the general design specification. In such an embodiment, the optical unit 120 may be manufactured to have a second pitch lower than a first pitch at which the light from the pixels for view images having continuous viewing indices is to be transferred to the left eye position and the right eye position. The second pitch may correspond to a pitch of a lens array of the optical unit 120 at which the light from the pixels for view images having discontinuous viewing indices are transferred to the left eye position and the right eye position, respectively, to provide an autostereoscopic image. Such an embodiment will be described in greater detail below with reference to FIG. 8.

With respect to a lens array interval, the optical unit 120 may have a lens array interval different from that specified in the general design specification that is designed to provide autostereoscopic images using the continuous viewing index. For example, one or more embodiments may include manufacturing the optical unit 120 to have a second interval less than a first interval of the general design specification that is designed to provide autostereoscopic images using the continuous viewing index approach. The second interval may correspond to a lens array interval of an optical unit at which light from pixels for view images having discontinuous viewing indices is provided to the left eye position and the right eye position, respectively, to produce an autostereoscopic image. Such an embodiment will be described in greater detail below with reference to FIG. 8.

According to one or more embodiments, the optical unit 120 may be manufactured to have a determined pitch for each individual lens protrusion to be a pitch different from a pitch of the general design specification that is designed to provide autostereoscopic images using the continuous viewing index approach, while having a lens array interval that may correspond to the lens array interval of the general design specification. According to one or more embodiments, the determined pitch may correspond to a pitch at which light from the pixels for view images having discontinuous viewing indices are provided to the left eye position and the right eye position, respectively, to produce an autostereoscopic image. Here, in one or more embodiments, a bottom portion between the individual lens protrusions may be configured to block light. Such an embodiment will be described in greater detail below with reference to FIG. 9.

With respect to a distance value from the panel unit 110 to the surface of the optical unit 120 and/or a thickness value of the optical unit 120, in one or more embodiments the optical unit 120 may have respective distance and/or thickness values different from that specified in the general design specification that is designed to provide autostereoscopic images using the continuous viewing index approach. For example, in one or more embodiments, the optical unit 120 may be manufactured to have a second distance or a second thickness respectively greater than a first distance or a first thickness of the general design specification that is designed to provide autostereoscopic images using the continuous viewing index approach. The second distance or the second thickness may correspond to a distance or a thickness at which the light from the pixels for view images having discontinuous viewing indices are provided to the left eye position and the right eye position, respectively, to produce an autostereoscopic image. Such an embodiment will be described in greater detail below with reference to FIG. 10.

With respect to a radius of curvature of individual lens protrusions of the optical unit 120, the respective lens protrusions of the optical unit 120 may have a radius of curvature different from the radius of curvature of the general design specification. The optical unit 120 may be manufactured to have a second radius of curvature greater than a first radius of curvature of the general design specification that is designed to provide autostereoscopic images using the continuous viewing index approach. According to one or more embodiments, the second radius of curvature may correspond to a radius of curvature of an optical unit at which the light from pixels for view images having discontinuous viewing indices are provided to the left eye position and the right eye position, respectively, to provide an autostereoscopic image. Such an embodiment will be described in greater detail below with reference to FIG. 11.

Accordingly, the optical unit 120 may form a viewing cone and provide, to the user, light from pixels corresponding to a plurality of viewpoints through a pixel array. In one or more embodiment, the optical unit 120 may be configured so as to have a decreased viewing angle of a viewing cone for the light from the pixels for view images having discontinuous viewing indices provided to the left eye position and the right eye position of the user positioned, at the pre-designated viewing distance, to produce an autostereoscopic image. The decreased viewing angle may be with regard to a viewing angle that could have been produced by the optical unit 120 if the viewing index approach was the continuous viewing index approach, or according to the general design specification, for producing autostereoscopic images using the continuous viewing index approach. With this decreased viewing angle, a viewing angle density with respect to an angular distribution of viewpoints may increase compared to a viewing angle density according to the viewing angle that could be produced if the viewing index approach was the continuous viewing index approach or according to the general design specification. Accordingly, in one or more embodiments the user may be provided with view images corresponding to such denser viewpoints.

Figure 2:
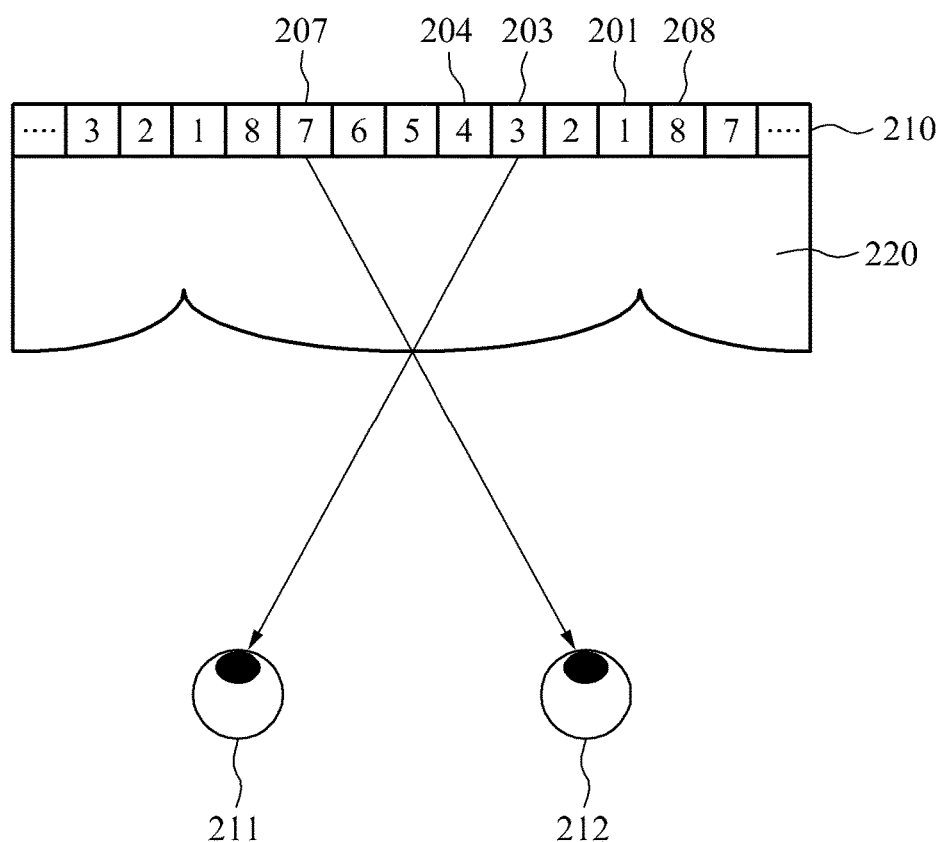
FIG. 2 illustrates a process of providing view images to both eyes of a user, according to one or more embodiments.

FIG. 2 illustrates a process of providing view images to both eyes of a user, according to one or more embodiments. As only an example, an 8-view display apparatus is also illustrated in FIG. 2.

Referring to FIG. 2, a panel unit 210 may include a pixel array, where a respective viewing index is illustrated for each of plural pixels of the pixel array for respective view images, such as for pixels 201, 203, 204, 207, and 208 of the illustrated pixel array. To provide an autostereoscopic image, i.e., the 3D effect, optical unit 220 may direct light from pixel 203 corresponding to a viewing index of "3" to a left eye 211 of a user positioned at a pre-designated viewing distance, and the optical unit 220 may direct light from pixel 207 corresponding to a viewing index of "7" to a right eye 212 of the user. Similarly, to further achieve the 3D effect, light from pixel 208 corresponding to a viewing index of "8" may be directed to the left eye 211 and light from pixel 204 corresponding to a viewing index of "4" may be transferred to the right eye 212. Differently, as noted above with regard to a general related art with a continuous viewing index approach, to achieve the 3D effect the related art directs light from such a pixel 203 is to a left eye 211 of the user and directs light from such a pixel 204 corresponding to a viewing index of "4" to a right eye 212. Likewise, in this example continuous viewing index related art approach, the 3D effect is achieved by directing light from such a pixel 204 corresponding to a viewing index of "4" to a left eye 211 of the user and directing light from the sequentially adjacent pixel corresponding to a viewing index of "5" to a right eye 212.

As also explained above, when a user moves between viewing cone boundaries the example continuous viewing index related art approach may direct light from such a pixel 208 corresponding to a viewing index of "8" to a left eye 211 of the user and direct light from such a pixel 201 corresponding to a viewing index of "1" to a right eye 212, which results in a pseudoscopic image being seen by the user. In this example, because the disparity between the viewing indices of pixels 208 and 201 is great, or critically large, the user may actually view two separate images, i.e., the respective eighth view image and the first view image. In an embodiment, a pseudoscopic region may be broadened compared to a pseduoscopic region of the related art that implements the continuous viewing index approach. Again, in this example continuous viewing index related art approach, the user may experience the critical amount of X-talk when a view image having a viewing index of "8" is provided to the left eye 211 and a view image having a viewing index of "1" is provided to the right eye 211.

Rather, as explained above in one or more embodiments, when the viewing index difference is greater than one, it may be possible to avoid this critical amount of X-talk. However, in one or more embodiments, when the difference between viewing indices of view images provided to the left eye 211 and the right eye 212 corresponds to "4", and not "1" like the example continuous viewing index related art approach, the user may now experience an immense 3D effect or depths may be substantially exaggerated, resulting in visual fatigue. In order to reduce such visual fatigue, the display apparatus may reduce the 3D effect generated by the input multi-view image in advance. For example, in one or more embodiments, when a view arrangement of the example first through eighth view images is generated after depth disparities of the input multi-view image are decreased by ¼ as a whole, as only an example, the user may now experience the 3D effect as if the viewing index difference was "1", e.g., experience a 3D effect similar to the 3D effect provided by the example continuous viewing index related art approach even though the viewing index difference actually corresponds to "4". Accordingly, in one or more embodiments, the display apparatus may further include a processor to compensate for a proposed discontinuous viewing index approach by adjusting a depth disparity of the input multi-view image, or depth disparities of one or more view images of the multi-view image. A configuration of such a processor will be described in greater detail below with reference to FIG. 3, as only an example.

Figure 3:
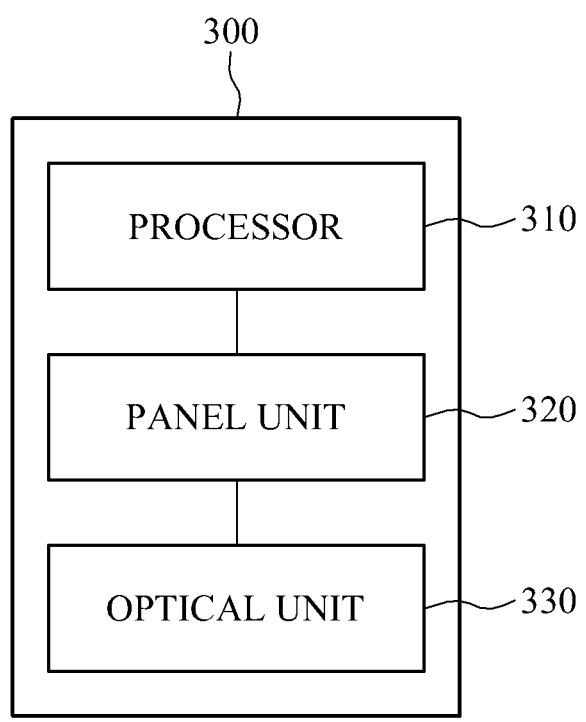
FIG. 3 illustrates a display apparatus, according to one or more embodiments.

FIG. 3 illustrates a display apparatus 300, according to one or more embodiments.

Referring to FIG. 3, the display apparatus 300 may include, for example, a panel unit 320, an optical unit 330, and a processor 310 to compensate for a proposed discontinuous viewing index by adjusting a depth disparity of an input multi-view image. Various examples of structures and functions of the panel unit 320 and the optical unit 330 are available with reference to FIG. 1, depending on embodiment, and thus, repeated descriptions will be omitted here for conciseness and ease of description.

When a viewing index difference between view images provided to a left eye and a right eye of a user positioned at a pre-designated viewing distance corresponds to N based on the structure of the optical unit 330, the processor 310 may decrease a disparity of each view image of the input multi-view image by a factor of 1/N, and provide the adjusted multi-view image to the panel unit 320. Here, N may be a natural number. For example, when the viewing index difference of the view images provided to the both eyes of the user positioned at the pre-designated distance corresponds to "2", the processor 310 may decrease depth disparities or a 3D effect of the multi-view image by a factor of ½ and provide the corresponding view images of the multi-view images to the panel unit 320. The level of the depth disparities or 3D effect adjustment may be pre-designated based on the structure of the optical unit 330 or determined based on user settings. Accordingly, the level or amount of the depth disparities or 3D effect adjustment may be optional to compensate for a difference in a 3D effect based on the structure of the optical unit 330. An implementation thereof is not limited to any particular technology in terms of a software scheme and/or a hardware scheme.

Figure 4:
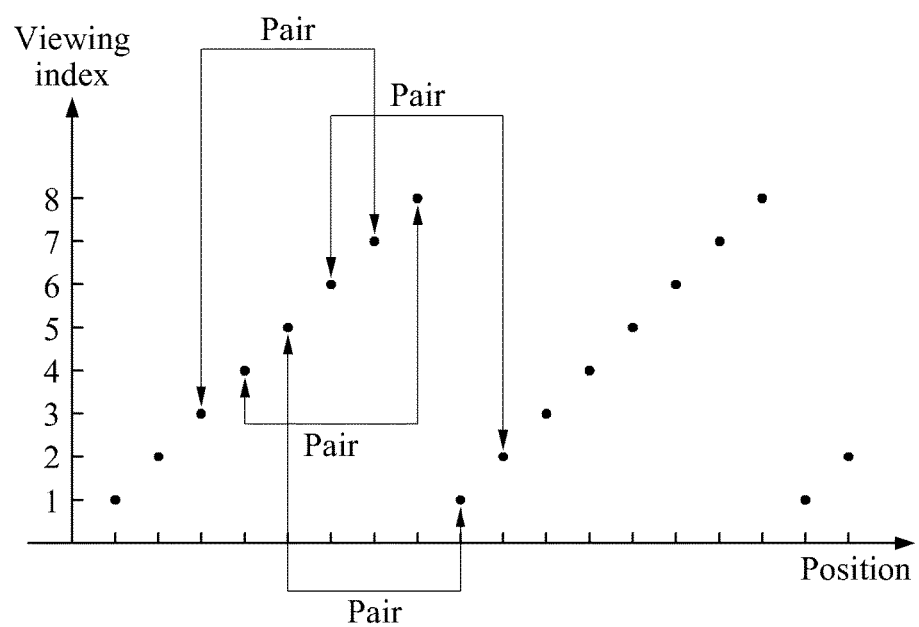
FIG. 4 illustrates a relationship between a viewing index and a user position, and left and right eye viewing pairs, according to one or more embodiments.

FIG. 4 illustrates a relationship between viewing indices of provided images and positions, e.g., lateral positions in and between differing viewing cones, of left and right eye viewing pairs, according to one or more embodiments.

Here, view images with differing viewing indices may be received by such left and right eye viewing pairs of a user as the viewer moves. Each viewing index pair can be considered to be the corresponding two, for example, index differences between the different view image images that are collectively observed by the user as the user moves within and between different viewing cones. As noted above, and in contrast to previous continuous viewing index approaches, in one or more embodiments a viewing index pair provided to both eyes of a user may represent view images with discontinuous viewing indices.

As described above, when an optical unit is provided in a structure in which a viewing index difference corresponds to "4", e.g., in an example of an 8-view display apparatus, viewing index pairs may include a (3, 7) pair, a (4, 8) pair, a (5, 1) pair, and a (6, 2) pair, as only an example. In such an embodiment, the viewing index differences of the pairs may correspond to "+4" (7−3), "+4" (8−4), "−4" (1−5), and "−4" (2–6). Regions in which the viewing index differences correspond to negative values may be construed to be pseudoscopic regions. Rather, in the related art continuous viewing index approaches the viewing index difference would correspond to "1", so that there is a potential in a corresponding 8-view display for the viewing index differences to be "1" or "−7" (1–8), with the "−7" negative viewing index difference representing the pseduoscopic region. In this related art example, this viewing index difference of "−7" may result in a critical amount of X-talk between the concurrently observed first viewing index view image and eighth viewing index view image so that the user may actually separately observe the first viewing index view image and the eighth viewing index view image as respective 2D images.

As described above, in one or more embodiments the pseudoscopic region may be larger than a pseudoscopic region that may exist when implementing the related art's continuous viewing index approach, i.e., where the user observes different neighboring viewing index view images, e.g., (1, 2), (2, 3), (3, 4), (4, 5), etc., from adjacent pixels. However, in one or more embodiments, an absolute value of a maximum viewing index difference may only correspond to "4" in a corresponding the pseudoscopic region. Thus, according to one or more embodiments, an absolute value of a maximum viewing index difference may be less than the above noted maximum viewing index difference of "7" (=|1−8|) of the related art continuous viewing index approach. In addition, in the example system where the maximum viewing index difference is "4", since a depth disparity of an input multi-view image may be decreased by a factor of ¼ before display, in one or more embodiments, each of the viewing index differences shown in FIG. 4 may in effect be observed as to "+1", "+1", "−1", and "−1", for example.

As another example, two example embodiments are below, in Table 1, contrasted to a related art continuous viewing index approach.

ments, a viewing index difference of a viewing index pair respectively provided to both eyes may correspond to "2" or "4". Here, although the pseudoscopic region may increase with the greater viewing index differences compared to the related art continuous viewing index approach, according to one or more embodiments a viewing index difference would be less than the viewing index difference of "−7" of the related art, and thus such an X-talk creating critical viewing index difference between provided view images may not occur in one or more embodiments. In addition, by providing such view images after an adjusting of a depth disparity of the input multi-view image, the viewing index difference may further decrease in one or more embodiments. In the above example of Table 1, where the viewing index difference is "2", there are two pseudoscopic regions, and the viewing index difference corresponds to "−3" after such depth disparity adjusting. Thus, the X-talk that exists in the related art continuous viewing index approach can be avoided in one or more embodiments. In addition, even in the above example of Table 1, where the viewing index difference is "4", although there are four pseudoscopic regions, the viewing index difference after the disparity adjustment corresponds to "1" or "−1". Accordingly, in one or more embodiments, the X-talk that may occur when viewing index differences are large may be alleviated or avoided remarkably.

Figure 5:
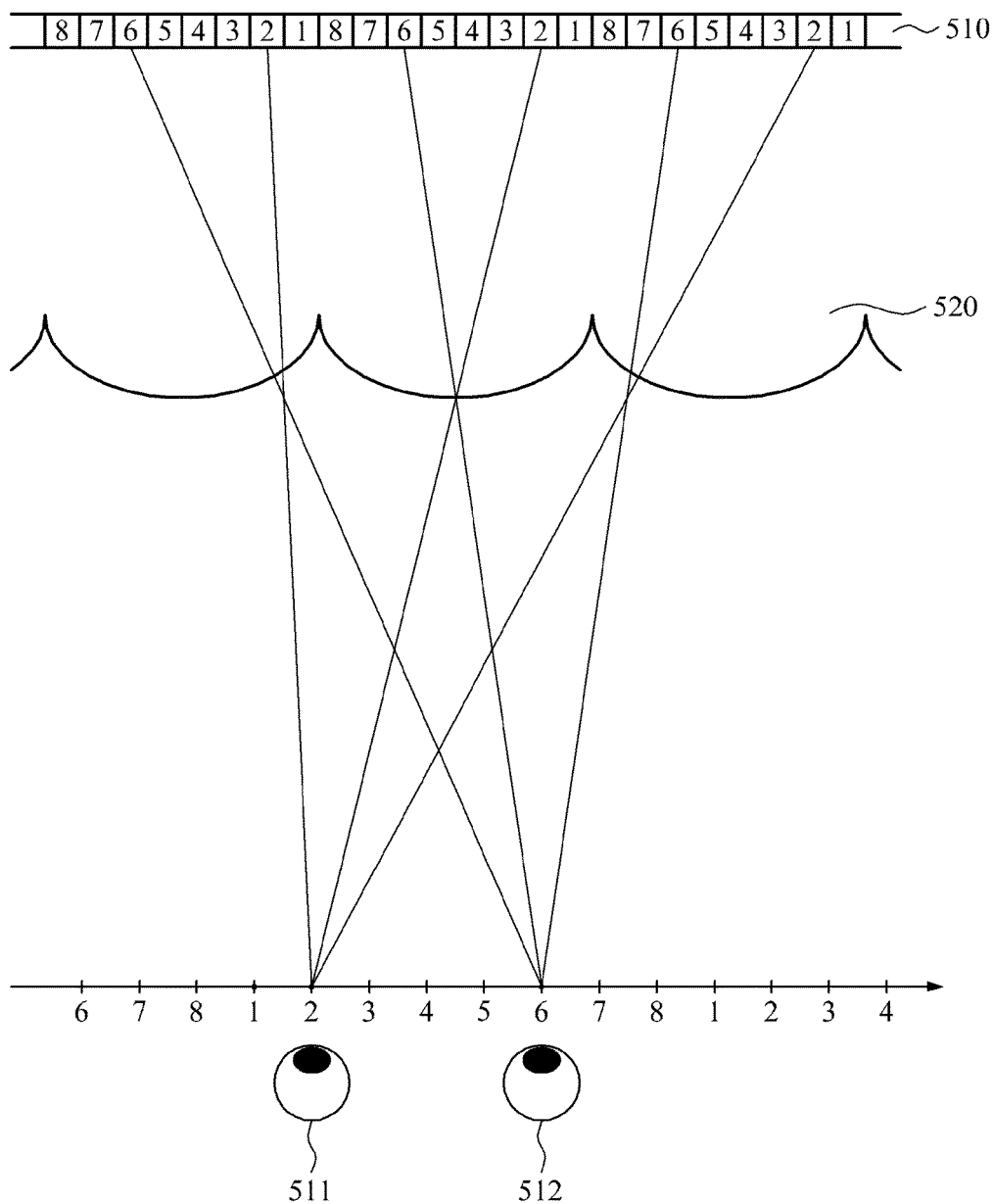
FIG. 5 illustrates a process of projecting view images to a left eye and a right eye of a user, according to one or more embodiments.

FIG. 5 illustrates a process of providing view images to a left eye and a right eye of a user, according to one or more embodiments.

Pixels of a panel unit 510 may provide, through an optical unit 520, view images having a viewing index difference of "4" to a left eye 511 and a right eye 512 of a user positioned at a predetermined viewing distance. In such an embodiment, when depth disparities of input multi-view images are adjusted by ¼, for example, as described above with regard to Table 1, the user may experience a relatively weakened pseudoscopic illusion when moving between viewing cones compared to the pseudoscopic illusion of the continuous viewing index approach.

TABLE 1

| Related art continuous viewing index approach | | Example embodiment (viewing index difference = 2) | | | Example embodiment (viewing index difference = 4) | | |
|---|---|---|---|---|---|---|---|
| Viewing index pair | Viewing index difference | Viewing index pair | Viewing index difference (before adjustment) | Viewing index difference (after adjustment) | Viewing index pair | Viewing index difference (before adjustment) | Viewing index difference (after adjustment) |
| 1, 2 | 1 | 1, 3 | 2 | 1 | 1, 5 | 4 | 1 |
| 2, 3 | 1 | 2, 4 | 2 | 1 | 2, 6 | 4 | 1 |
| 3, 4 | 1 | 3, 5 | 2 | 1 | 3, 7 | 4 | 1 |
| 4, 5 | 1 | 4, 6 | 2 | 1 | 4, 8 | 4 | 1 |
| 5, 6 | 1 | 5, 7 | 2 | 1 | 5, 1 | −4 | −1 |
| 6, 7 | 1 | 6, 8 | 2 | 1 | 6, 2 | −4 | −1 |
| 7, 8 | 1 | 7, 1 | −6 | −3 | 7, 3 | −4 | −1 |
| 8, 1 | −7 | 8, 2 | −6 | −3 | 8, 4 | −4 | −1 |
| 1, 2 | 1 | 1, 3 | 2 | 1 | 1, 5 | 4 | 1 |
| 2, 3 | 1 | 2, 4 | 2 | 1 | 2, 6 | 4 | 1 |
| 3, 4 | 1 | 3, 5 | 2 | 1 | 3, 7 | 4 | 1 |

As shown in Table 1, in the related art continuous viewing index approach, a viewing index difference of a viewing index pair provided to the respective eyes of a user can be "1" or "−7". Here, although this results is only a single pseudoscopic region, the user may recognize the provided images as two separate 2D images, not 3D images, due to a critical amount of X-talk. However, in one or more embodi- Hereinafter, alternate configurations of the optical unit 520 for providing a multi-view image will be described in greater detail, as only examples.

Figure 6:
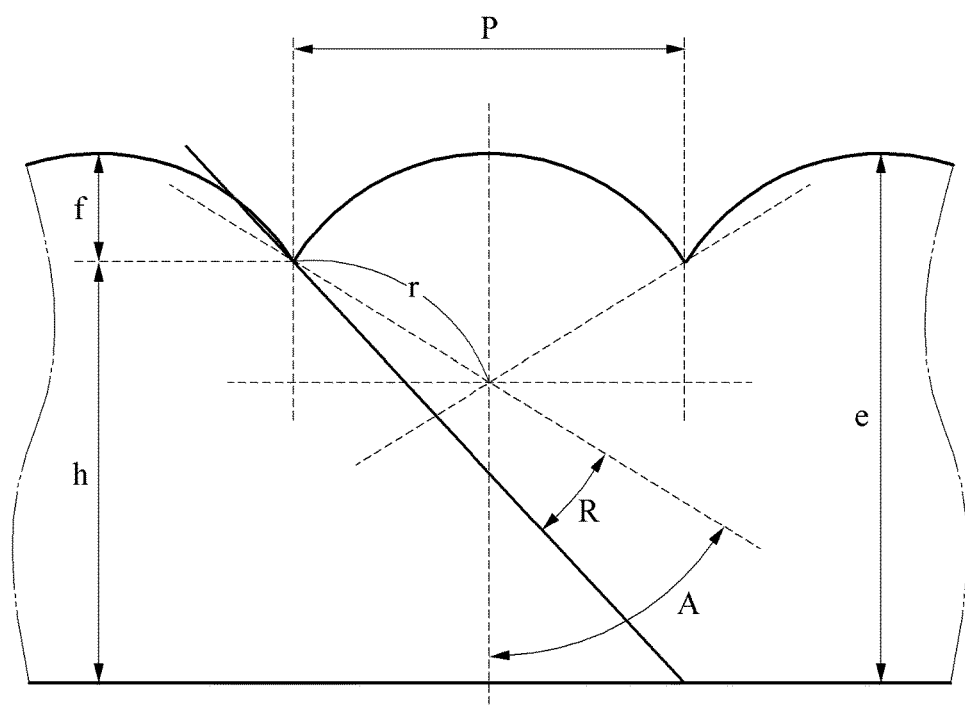
FIGS. 6 and 7 illustrate structures of a lenticular lens, according to one or more embodiments.
Figure 7:
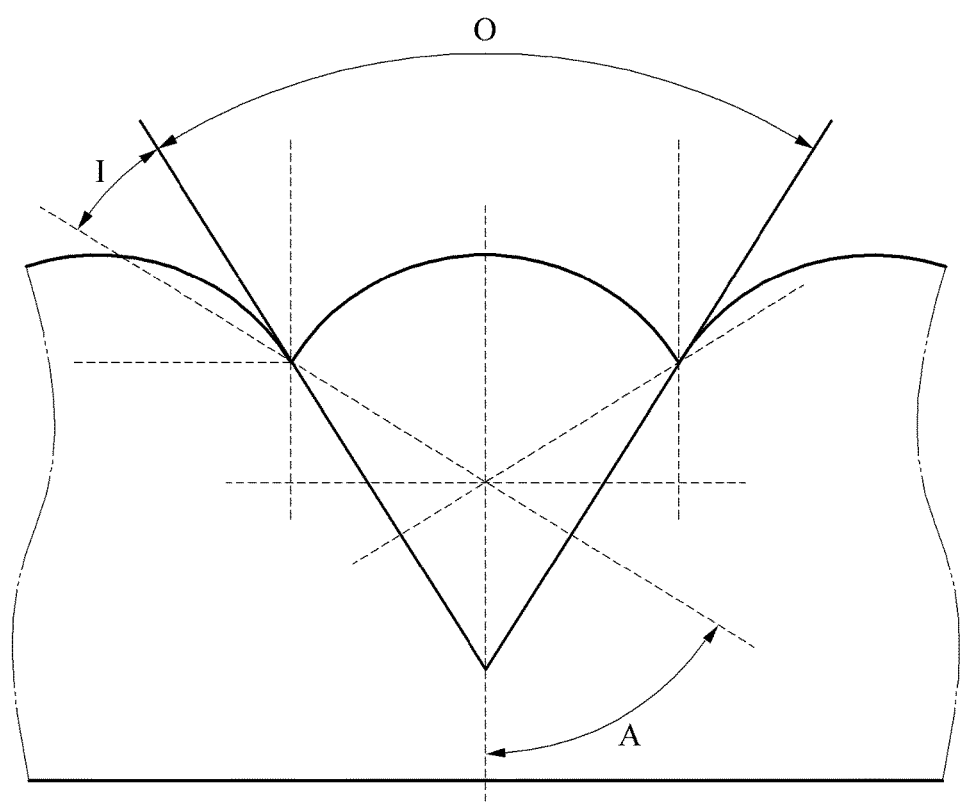

FIGS. 6 and 7 illustrate structures of a lenticular lens, according to one or more embodiments. As only an example, in such structures of the lenticular lens, the following Equations 1 through 3 may be satisfied.

$$R = A - \arctan\left(\frac{p}{h}\right) \quad \text{Equation 1}$$

$$A = \arcsin\left(\frac{p}{2r}\right) \quad \text{Equation 2}$$

In the above equations 1 and 2 and FIG. 6, "R" denotes an angle between an extreme ray of the lens and a normal at a point where the extreme ray exits the lens. "A" denotes an angle of a curved surface viewed at a center of the curved surface, "p" denotes a pitch or an area of each lenticular cell, "r" denotes a radius of curvature of the lenticular lens, and "h" denotes a thickness of a substrate below the curved surface of the lens. Here, "h" may be calculated using the below Equation 3, for example.

$$h = e - f \quad \text{Equation 3:}$$

In Equation 3, "e" denotes a thickness including the curved surface of the lens, and "f" denotes a thickness of the curved surface of the lens. Here, "f" may be calculated based on the radius of curvature "r" and the pitch "p", using the below Equation 4, for example.

$$f = r - \sqrt{r^2 - \left(\frac{p}{2}\right)^2} \quad \text{Equation 4}$$

By changing at least one, two, or all of the "r", "p", and "h" terms, view images having a viewing index difference greater than or equal to "2" may be provided to a left eye and a right eye, respectively, positioned at a pre-designated viewing distance. Other modifications may be made thereto and detailed descriptions in this regard will be discussed in greater detail further below.

Referring to FIG. 7, a relationship among "O" denoting a viewing angle of a viewing cone in a lenticular cell, "I" denoting an angle between the extreme ray and the normal, and "A" described above may be expressed according to the below Equation 5, for example.

$$O = 2(A - I) \quad \text{Equation 5:}$$

When "n" denotes a refractive index of the lens and "$n_a$" denotes a refractive index of air, a relationship expressed by the below Equation 6, for example, may be satisfied.

$$I = \arcsin\left(\frac{n \sin(R)}{n_a}\right) \quad \text{Equation 6}$$

Referring to the above example Equations 1 through 6, when a decrease in the pitch "p", an increase in "h" or "e", an increase in the radius of curvature, and a decrease in the refractive index occur, for example, the viewing angle "O" may decrease, leading to an increase in a view density. Accordingly, a view arrangement according to one or more embodiments may be possible. In addition to such embodiments, alternative modifications may also be possible. Still further, modifications and variations can be made without departing from the spirit of the present disclosure.

The aforementioned embodiments will be described in greater detail below along with a structure of an optical unit, according to one or more embodiments.

Figure 8:
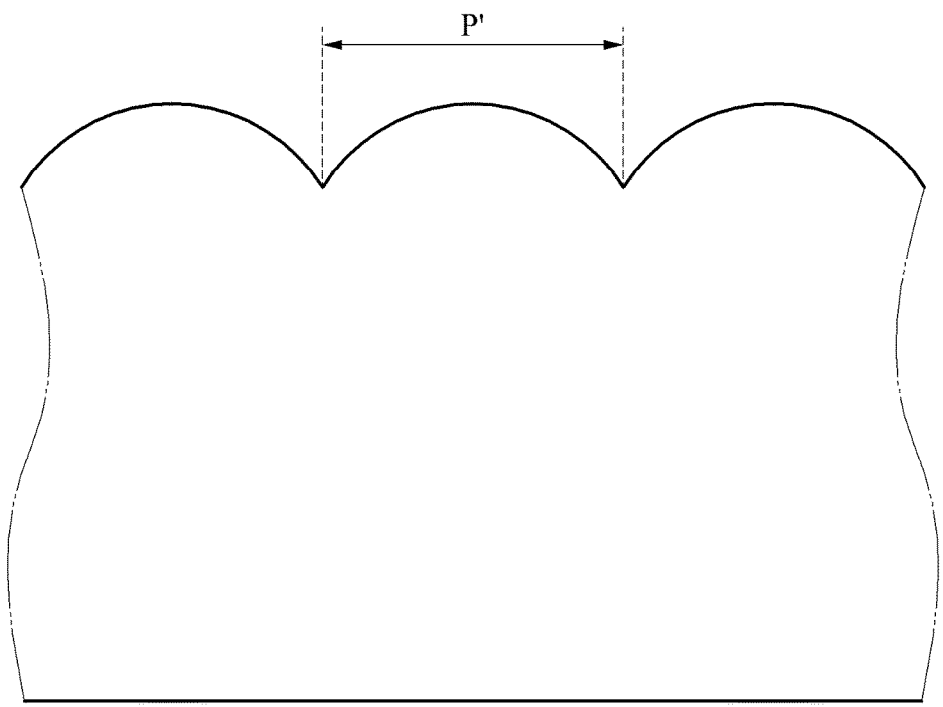
FIG. 8 illustrates a structure of an optical unit with a determined lens array pitch and an adjusted lens array interval, according to one or more embodiments.

FIG. 8 illustrates a structure of an optical unit 800 with an adjusted lens array pitch and an adjusted array interval, according to one or more embodiments.

Referring to FIG. 8, the optical unit 800 may have a second pitch p' of a lens array lower than a first pitch p, e.g., of the aforementioned general design specification for a continuous viewing index approach. The second pitch p' may correspond to a lens array pitch of an optical unit where light from corresponding pixels for view images having discontinuous viewing indices may be provided to a left eye position and a right eye position, respectively.

In such an embodiment, a distance between lenticular cells or a lenticular lens array interval may also be caused to be decreased, e.g., during manufacture, along with the pitch, compared to the aforementioned general design specification for a continuous viewing index approach. An interval according to one or more embodiments, corresponding to a lens array interval of the optical unit 800, may correspond to a value that is less than the corresponding lens array interval implemented according to the general design specification for the continuous viewing index approach, for example. Such an interval according to one or more embodiments may correspond to a lens array interval of an optical unit where light from pixels having a discontinuous viewing index may be provided to the left eye position and the right eye position, respectively.

As illustrated in FIG. 8, when the pitch and the lens array interval are both of a same value that is caused to be decreased, e.g., during manufacture and compared to the example general design specification, a number of lenticular lens cells may be increased, e.g., during manufacture and compared the example general design specification, to cover a panel unit having a same area as the example general design specification. However, in one or more embodiments, the lens array interval may not be necessarily identical or of a same value as the pitch. In another embodiment, the lens array interval may be maintained to be a general interval, e.g., similar to the lens array interval of the general design specification, and the pitch may be reduced compared to the general design specification. Such an embodiment will be described in greater detail below with reference to FIG. 9.

Figure 9:
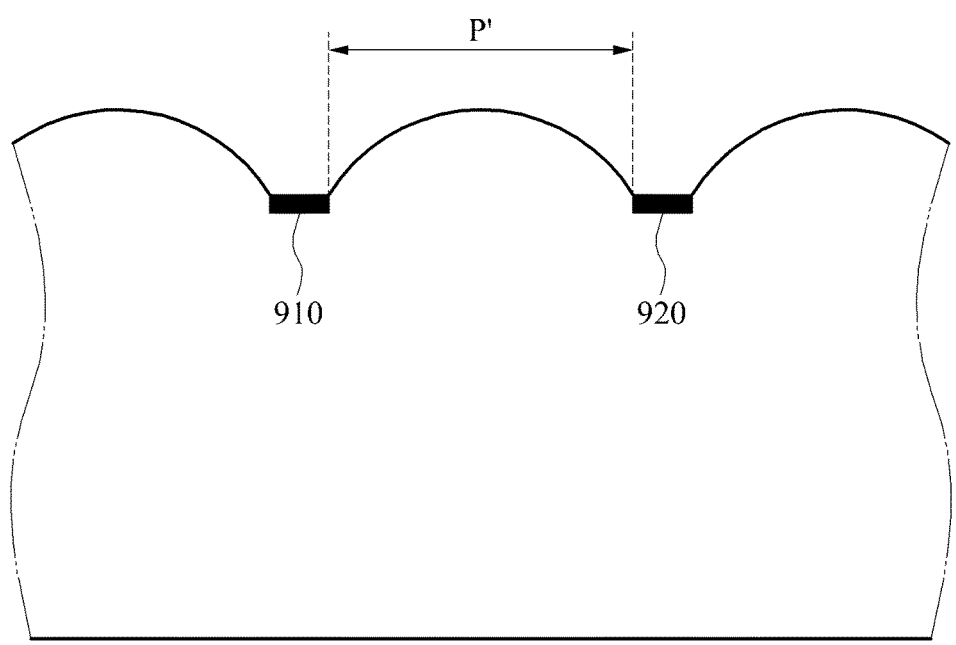
FIG. 9 illustrates a structure of an optical unit with a determined lens array pitch, according to one or more embodiments.

FIG. 9 illustrates a structure of an optical unit 900 with such an adjusted lens array pitch, according to one or more embodiments.

Referring to FIG. 9, the optical unit 900 may have a same pitch p' as discussed above with regard to FIG. 8, and have a same lens array interval as in the general design specification. In such an embodiment, a bottom portion may be disposed between lens array cells. The bottom portion may be manufactured to prevent light from passing through bottom portions, for example. By preventing penetration of unnecessary light, viewing cones may be implemented accurately, for example. As shown in FIG. 9, in one or more embodiments bottom portions 910 and 920 may be coated with a material that blocks light penetration. In addition to such a coating, other various methods or approaches may be employed to block light. When blocking of light is not necessary, depending on embodiment, such blocking may be omitted.

Figure 10:
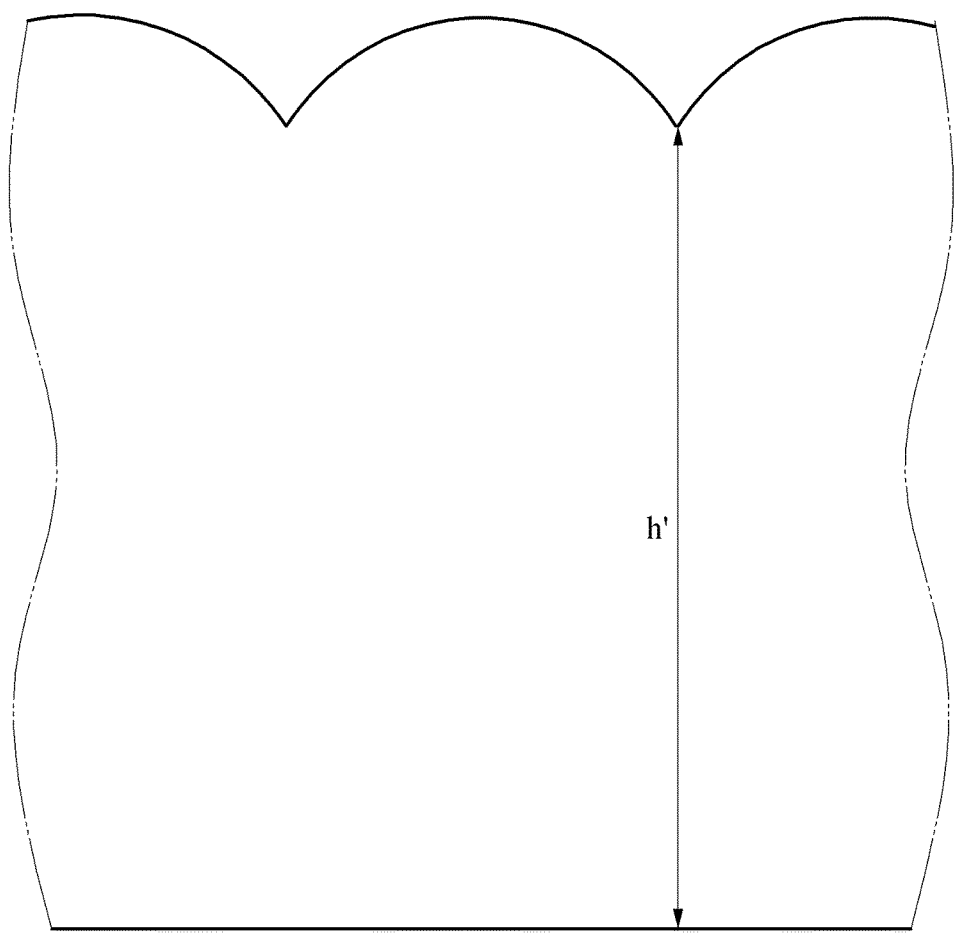
FIG. 10 illustrates a structure of an optical unit with a determined distance between a lens outer side surface and a panel unit, according to one or more embodiments.

FIG. 10 illustrates a structure of an optical unit 1000 with a distance h' between a lens outer side surface and a panel unit, according to one or more embodiments.

Referring to FIG. 10, a thickness of a substrate below a curved surface of the optical unit 1000 may be set to the distance h' which is greater than such a distance according to the general design specification. In addition, referring to the above Equation 3, a thickness of the entire lens may be set to be a value greater than "e", and/or a thickness of the curved surface may be set to be a value less than "f".

In such an embodiment, the optical unit 1000 may be manufactured to have a distance or thickness that is greater than such a distance or thickness of the general design specification where light from pixels for view images having continuous viewing indices is to be provided to a left eye position and a right eye position at a pre-designated viewing distance, for example. The example distance or thickness according to one or more embodiments may correspond to a distance or a thickness at which light from pixels for view images having discontinuous viewing indices, such as described herein, may be provided to the left eye position and the right eye position, respectively.

Figure 11:
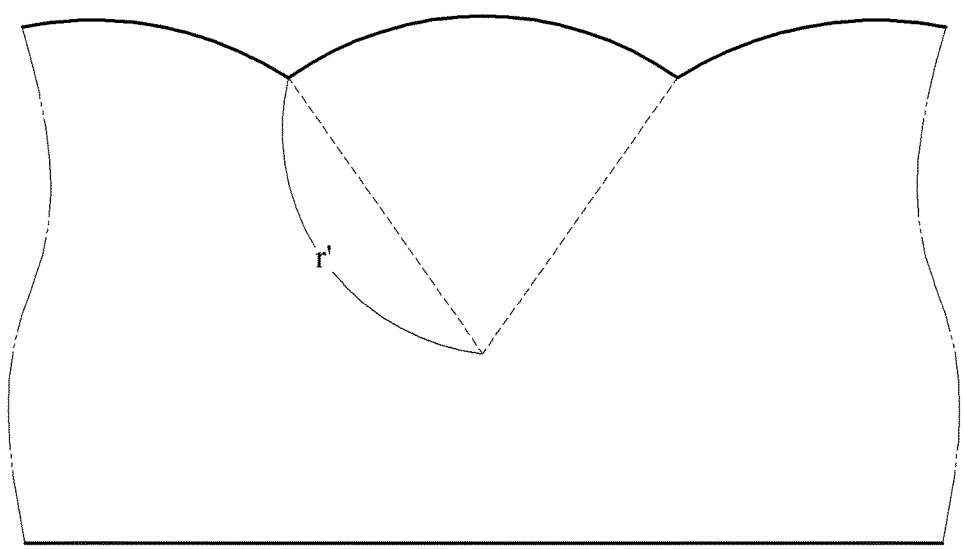
FIG. 11 illustrates a structure of an optical unit with a determined lens radius of curvature, according to one or more embodiments.

FIG. 11 illustrates a structure of an optical unit with a lens radius r' of curvature, according to one or more embodiments.

Referring to FIG. 11, according to one or more embodiments, the optical unit may have a radius of curvature r' that is greater than a radius of curvature according to the general design specification for the continuous viewing index approach, for example. Referring to the above Equations 1, 2, and 4, when a lens radius of curvature is great, a viewing angle of a viewing cone may decrease and a view density may increase. Accordingly, in one or more embodiments, light from pixels for view images having discontinuous viewing indices may be provided to a left eye and a right eye positioned at a pre-designated viewing distance, as described above.

Figure 12:
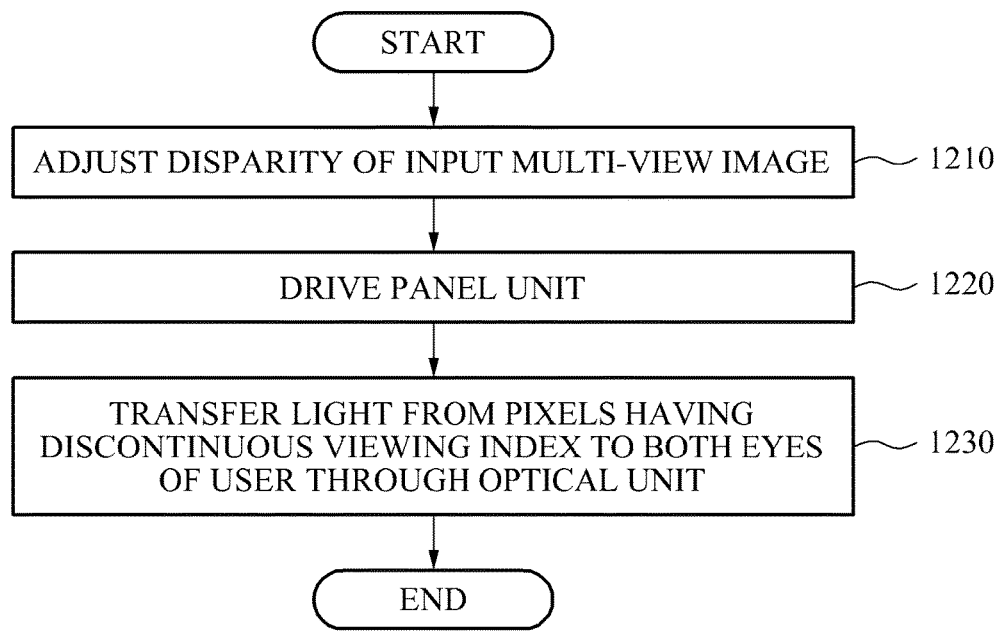
FIG. 12 illustrates a display method, according to one or more embodiments.

FIG. 12 illustrates a display method, according to one or more embodiments. Below operations are described with regard the processor 310, panel unit 320, and optical unit 330 of the display apparatus 300 of FIG. 3, noting that alternative implementing hardware devices are equally available.

Referring to FIG. 12, the example processor 310 of the display apparatus 300 of FIG. 3 may control an adjustment of a depth disparity of an input multi-view image, in operation 1210. As described with reference to FIGS. 2 and 3, for example, by providing view images corresponding to discontinuous viewing indices to a left eye and a right eye, respectively, an autostereoscopic image having a large viewing index difference, e.g., 2 or 4, may be directed to the user and thus, a 3D effect may increase. Accordingly, to prevent distortion of the natural 3D effect of the 3D contents of the input multi-view image and to reduce visual fatigue of a user, the example processor 310 may compensate for such an increased 3D effect by adjusting existing depth disparity information of the input multi-view image, for example.

When a viewing index difference between the view images provided to the left eye and the right eye of the user positioned at a pre-designated viewing distance corresponds to N based on a structure of the example optical unit 330, the example processor 310 may decrease a depth disparity of each view image of the input multi-view image by a factor of 1/N, and provide the depth disparity adjusted multi-view image to the example panel unit 320. Here, N may be a natural number. For example, when the viewing index difference corresponds to "4", the example processor 310 may adjust disparities or a 3D effect of the view images of the input multi-view image to be input by a factor of ¼. In such an operating method, operation 1210 may be an optional operation, and an implementation thereof is not limited to any particular technology in terms of a software scheme and/or a hardware scheme.

In operation 1220, the example panel unit 320 may be driven to provide the input multi-view image through pixel arrays, e.g., to provide different view images with differing viewing indices. In operation 1230, view images of the multi-view image may be transferred/provided/directed to both eyes of the user through the example optical unit 330. In such an embodiment, the example optical unit 330 may be provided in a structure in which light from pixels for view images having discontinuous viewing indices may be transferred to a left eye position and a right eye position of the user positioned at the pre-designated viewing distance. For example, when a third view image is set to be provided to the left eye of the user positioned at the pre-designated viewing distance, a seventh view image may be set to be provided to the right eye.

In one or more embodiments, at least one or more of a refractive index corresponding to a material of the example optical unit, a radius of curvature of a surface of the example optical unit, a pitch of a lens array included in the example optical unit, a distance from the example panel unit to the surface of the example optical unit, and a lens array interval of the example optical unit may be different from a general design specification for a continuous viewing index approach. Aspects of such embodiments have already been described with reference to FIGS. 1 and 6 through 11, for example, and thus, repeated descriptions will be omitted here for conciseness and ease of description.

Units described herein may be implemented using hardware components and/or software components controlling one or more hardware processing devices. In one or more embodiments, the hardware components may include microphones, amplifiers, band-pass filters, audio to digital convertors, and processing devices, as only examples. Such one or more processing devices may be implemented using one or more general-purpose or special purpose computers, such as, for example, a processor, a controller and an arithmetic logic unit, a digital signal processor, a microcomputer, a field programmable array, a programmable logic unit, a microprocessor, as only examples, or any other device capable of responding to and executing instructions in a defined manner. The processing device may control a running of an operating system (OS) and implement one or more software applications that run on the OS, as only examples. The one or more processing devices may also implement/control at least one or more of an access operation, a storing operation, a manipulating operation, a data creating operation, and alternate processes in response to an execution of such software, as only examples. For purpose of simplicity, the description of a processing device is used as singular; however, one skilled in the art will appreciated that a processing device may include multiple processing elements and multiple types of processing elements. In one or more embodiments, the processing device may include multiple processors or a processor and a controller. In addition, different processing configurations are possible, such a parallel processors.

Such software may include a computer program, a piece of code, an instruction, or some combination thereof, to independently or collectively instruct or configure the processing device to operate as desired. Software and/or data may be embodied permanently or temporarily in any type of machine, component, physical or virtual equipment, non-transitory computer storage medium or device. Systems of methods of one or more embodiment may also may be distributed over network coupled computer systems so that such instructions and/o implementations are stored and executed in a distributed fashion. As an example, the software and/or data may be stored by one or more non-transitory computer readable recording mediums.

One or more method embodiments, e.g., in view of the above-described example embodiments, may be implemented through control of one or more processing devices according to instructions recorded in such non-transitory computer-readable media. The media may also include, alone or in combination with such instructions, data files, data structures, and the like. Examples of non-transitory computer-readable media may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like, as only examples. The described instructions may include both machine code, such as produced by a compiler, and files containing higher level code that may be executed by a computer or processing device using an interpreter, for example. The described hardware devices may be configured to act corresponding to one or more software modules in order to perform or control operations of any of the above-described embodiments, or vice versa, as only an example.

While aspects of one or more embodiments have been particularly shown and described with reference to the differing embodiments, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A display apparatus for providing a multi-view image, the display apparatus comprising:
   a processor;
   a panel unit comprising a pixel array comprising pixels, the panel unit being configured to provide light corresponding to viewpoints of the multi-view image, the viewpoints corresponding to viewing indices sequentially arranged based on a lateral position through the multi-view image; and
   an optical unit configured to direct the light corresponding to the viewpoints of the multi-view image provided by the panel unit to provide a stereoscopic pair of view images to a user based on viewpoints having discontinuous viewing indices directed by the optical unit to a left eye position and a right eye position of the user, respectively,
   wherein an absolute value of a difference between the directed viewing indices is a same greater-than-one value at all user viewing positions, and
   wherein the processor is configured to adjust respective depth disparities of the view images to effectively adjust the greater-than-one value to a value of one.

2. The display apparatus of claim 1, wherein the processor is configured to decrease the depth disparities of the view images as a discontinuity of the sequentially arranged viewing indices increases.

3. The display apparatus of claim 1, wherein the optical unit is configured to have properties different from a design specification where light, from pixels of a general pixel array, for view images having continuous viewing indices is provided by a general optical unit to a left eye position and a right eye position, respectively.

4. The display apparatus of claim 3, wherein the design specification comprises information of any one or any combination of any two or more of a refractive index corresponding to a material of the general optical unit, a radius of curvature of a surface of the general optical unit, a pitch of a general lens array included in the general optical unit, a distance from a general panel unit, including the general lens array, to the surface of the general optical unit, and a general lens array interval of the general optical unit.

5. The display apparatus of claim 4, wherein the optical unit is configured to have a refractive index less than the refractive index of the general optical unit that provides a 3D effect by directing the light from the pixels, of the general pixel array, for the view images having the continuous viewing indices to the left eye position and the right eye position, respectively, and so that the refractive index of the optical unit provides the 3D effect when the light from the pixels providing the light for the view images having the discontinuous viewing indices is provided to the left eye position and the right eye position, respectively.

6. The display apparatus of claim 4, wherein the optical unit is configured to have a radius of curvature greater than a radius of curvature of the general optical unit that provides a 3D effect by directing the light from the pixels, of the general pixel array, for the view images having the continuous viewing indices to the left eye position and the right eye position, respectively, and so that the radius of curvature of the optical unit provides the 3D effect when the light from the pixels providing the light for the view images having the discontinuous viewing indices is provided to the left eye position and the right eye position, respectively.

7. The display apparatus of claim 4, wherein the optical unit is configured to have a pitch less than the pitch of the general optical unit that provides a 3D effect by directing the light from the pixels, of the general pixel array, for the view images having the continuous viewing indices to the left eye position and the right eye position, respectively, and so that the pitch of the optical unit provides the 3D effect when the light from the pixels providing the light for the view images having the discontinuous viewing indices is provided to the left eye position and the right eye position, respectively.

8. The display apparatus of claim 4, wherein the optical unit is configured to have a distance from the panel unit to a surface of the optical unit that is greater than the distance from the general panel unit to the surface of the general optical unit that provides a 3D effect by directing the light from the pixels, of the general pixel array, for the view images having the continuous viewing indices to the left eye position and the right eye position, respectively, and so that the distance of the optical unit provides the 3D effect when the light from the pixels providing the light for the view images having the discontinuous viewing indices is directed to the left eye position and the right eye position, respectively.

9. The display apparatus of claim 4, wherein the optical unit is configured to have a lens array interval that is less than a lens array interval of the general optical unit that provides a 3D effect by directing the light from the pixels, of the general pixel array, for the view images having the continuous viewing indices to a left eye position and a right eye position, respectively, and so that the lens array interval of the optical unit provides the 3D effect when the light from the pixels providing the light for the view images having the discontinuous viewing indices is directed to the left eye position and the right eye position, respectively.

10. The display apparatus of claim 1, wherein the optical unit is configured to selectively redirect the light corresponding to the viewpoints of the multi-view image provided by the panel unit in a pair-based manner to substantially average cross-talk (X-talk) among stereoscopic pairs of view images to reduce a maximum disparity difference between stereoscopic pairs of view images arriving to the user when moving between viewing cones.

11. The apparatus of claim 1, wherein
the panel unit comprises a lenticular lens satisfying the equation $$R = A - \arctan\left(\frac{p}{h}\right),$$

and
R is an angle between an extreme ray of the lenticular lens and a normal at a point where the extreme ray exits the lenticular lens, A is an angle of a curved surface of the lenticular lens viewed at a center of the curved surface, p is a pitch or an area of each lenticular cell, and h is a thickness of a substrate below the curved surface of the lenticular lens.

12. The apparatus of claim 11, wherein
A satisfies the equation $$A = \arcsin\left(\frac{p}{2r}\right),$$

and
r is a radius of curvature of the lenticular lens.

13. The apparatus of claim 12, wherein
h satisfies the equation h=e−f, and
e is a thickness including the curved surface of the lenticular lens, and f is a thickness of the curved surface of the lenticular lens.

14. The apparatus of claim 13, wherein
f satisfies the equation $$f = r - \sqrt{r^2 - \left(\frac{p}{2}\right)^2}.$$

15. The apparatus of claim 1, wherein
the panel unit comprises a lenticular cell satisfying the equation O=2 (A−I), and
O is a viewing angle of a viewing cone in the lenticular cell, I is an angle between an extreme ray and a normal of the lenticular cell, and A is an angle of a curved surface of the lenticular cell.

16. A display apparatus for providing a multi-view image, the display apparatus comprising:
a processor;
a panel unit comprising a pixel array, the panel unit being configured to provide light corresponding to viewpoints of the multi-view image, the viewpoints corresponding to viewing indices sequentially arranged based on a lateral position through the multi-view image; and
an optical unit configured to form a viewing cone and direct light from pixels, included in the pixel array, in directions of the viewing cone to provide a stereoscopic pair of view images to a user based on viewpoints having discontinuous viewing indices directed by the optical unit to a left eye position and a right eye position of the user, respectively,
wherein an absolute value of a difference between the directed viewing indices is a same greater-than-one value at all user viewing positions, and
wherein the processor is configured to adjust respective depth disparities of the view images to effectively adjust the greater-than-one value to a value of one.

17. The display apparatus of claim 16, wherein the processor is further configured to decrease the depth disparities as a discontinuity of the sequentially arranged viewing indices increases.

18. The display apparatus of claim 16, wherein the optical unit is configured to have properties different from a design specification where light, from pixels of a general pixel array, for view images having continuous viewing indices is provided by a general optical unit to a left eye position and a right eye position, respectively.

19. The display apparatus of claim 18, wherein the design specification comprises information of any one or any combination of any two or more of a refractive index corresponding to a material of the general optical unit, a radius of curvature of a surface of the general optical unit, a pitch of a general lens array included in the general optical unit, a distance from a general panel unit, including the general lens array, to the surface of the general optical unit, and a general lens array interval of the general optical unit.

20. A method of providing a multi-view image, the method comprising:
providing light from pixels corresponding to viewpoints of the multi-view image from a panel unit comprising a pixel array comprising the pixels, the viewpoints corresponding to viewing indices sequentially arranged based on a lateral position through the multi-view image; and
directing the light corresponding to viewpoints of the multi-view image provided by the panel unit to provide a stereoscopic pair of view images to a user based on viewpoints having discontinuous viewing indices directed to a left eye position and a right eye position of the user, respectively, wherein an absolute value of a difference between the directed viewing indices is a same greater-than-one value at all user viewing positions, and
adjusting respective depth disparities of the view images to effectively adjust the greater-than-one value to a value of one.

21. A method of providing a multi-view image, the method comprising:
providing light corresponding to viewpoints of the multi-view image from a panel unit comprising a pixel array comprising pixels, the viewpoints corresponding to viewing indices sequentially arranged based on a lateral position through the multi-view image;
forming a viewing cone and directing the light from the pixels, included in the pixel array, in directions of the viewing cone, wherein the viewing cone provides light from the pixels to provide a stereoscopic pair of view images, of the multi-view image, to a user, based on viewpoints having discontinuous viewing indices directed to a left eye position and a right eye position of the user, respectively, and wherein an absolute value of a difference between the directed viewing indices is a same greater-than-one value at all user viewing positions; and adjusting respective depth disparities of the view images to effectively adjust the greater-than-one value to a value of one.

22. A display apparatus for providing a multi-view image, the apparatus comprising:

a processor;

a panel unit comprising a pixel array comprising pixels, the panel unit being configured to provide light corresponding to viewpoints of the multi-view image, the viewpoints corresponding to viewing indices sequentially arranged based on a lateral position through the multi-view image, which are sequentially projected through repeated respective sequential arrangements of the pixels; and an optical unit configured to direct the light from pixels providing the light corresponding to viewpoints of the multi-view image to provide a stereoscopic pair of view images to a user based on viewpoints having discontinuous viewing indices directed to a left eye position and a right eye position of the user, respectively, wherein an absolute value of a difference between the directed viewing indices is the same at all user viewing positions, and wherein the processor is configured to adjust respective depth disparities of the view images to effectively adjust the greater-than-one value to a value of one.

23. A non-transitory computer-readable storage medium storing instructions, that when executed by a processor, cause the processor to perform a method, the method comprising:

driving a panel unit comprising a pixel array comprising pixels to respectively provide light corresponding to viewpoints of the multi-view image, the viewpoints corresponding to viewing indices sequentially arranged based on a lateral position through the multi-view image; and directing light corresponding to viewpoints of the multi-view image provided by the panel unit that are separated by an index distance, to provide a stereoscopic pair of view images to a user based on viewpoints having discontinuous viewing indices directed to a left eye position and a right eye position of the user, respectively, wherein an absolute value of a difference between the directed viewing indices is the same at all user viewing positions; and adjusting respective depth disparities of the view images to effectively adjust the greater-than-one value to a value of one.

* * * * *